May 3, 1927.
G. EGLOFF
1,627,163
PROCESS OF TREATING OIL SHALE
Original Filed Jan. 10, 1921
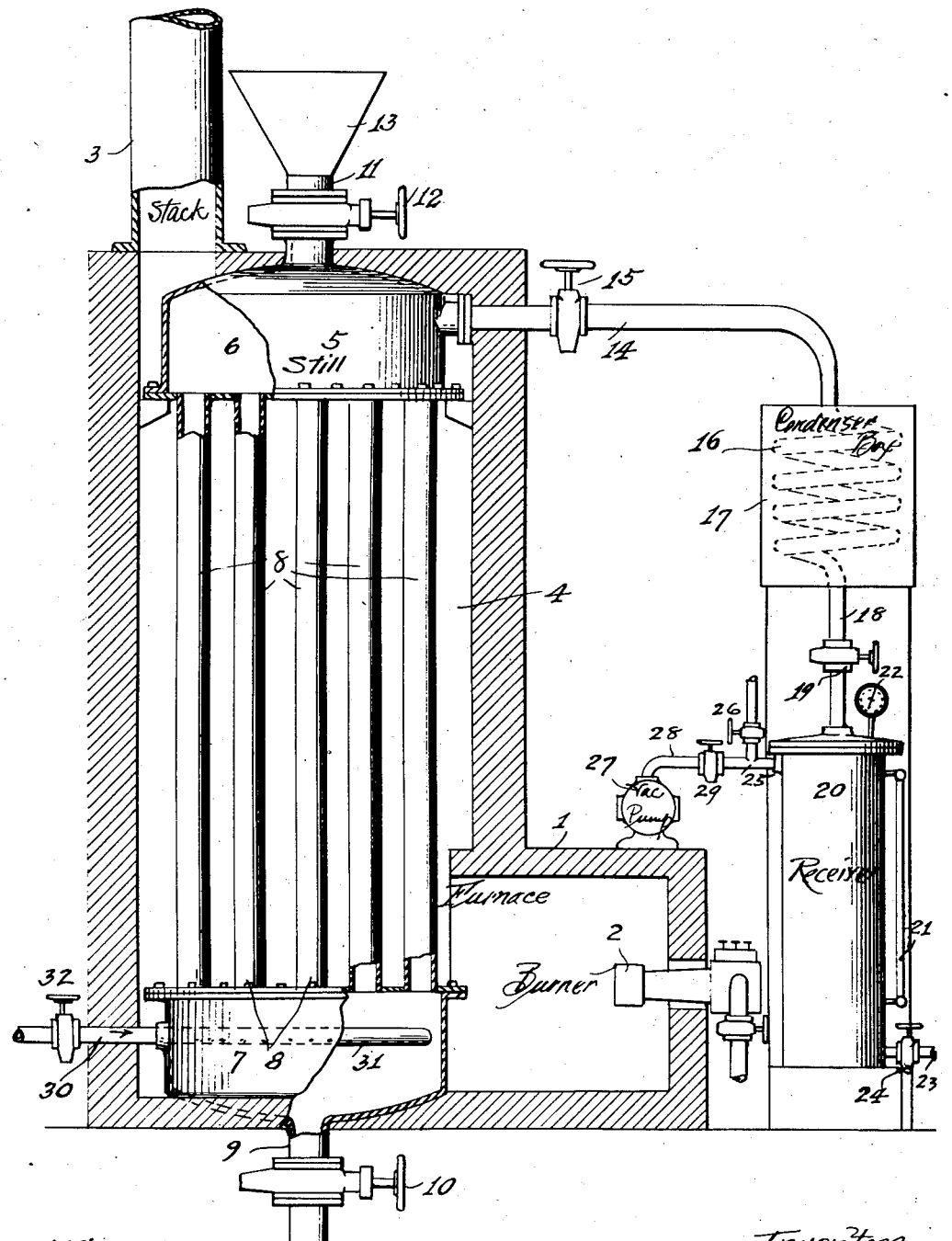
Witness,
Inventor,
Gustav Egloff.
By Frank L. Belknap Atty.

Patented May 3, 1927.

1,627,163

UNITED STATES PATENT OFFICE.

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PROCESS OF TREATING OIL SHALE.

Application filed January 10, 1921, Serial No. 436,044. Renewed February 4, 1927.

This invention relates to a process of treating oil shale and refers more particularly to the distillation of the oil shale in the presence of a chlorine or a member of the halogen series.

In the present invention, chlorine gas or gases of the halogen series, are forced upwardly through a plurality of tubes counter current to the downwardly passing supply of comminuted oil shale through the tubes. The tubes are subjected to the action of heat and the chlorine gas is converted into chlorine derivatives of the constituents of the shale oil or the gaseous hydrocarbons generated from the treatment of the shale. Further, I have found that aluminum chloride is formed as a product of the reaction between the aluminum compounds of the shale forming therefrom aluminum chloride and other chlorine derivatives of the mineral matter in the shale. Further, I have found that the generation of this aluminum chloride substance reacts with the shale oil vapors, producing a sweeter distillate from the oil shale than is normally produced under the ordinary methods of handling oil shale.

In the drawing, the single figure is a view, partly in side elevation and partly in vertical cross section, of my improved apparatus.

Referring in detail to the drawing, 1 designates a furnace, provided with burner 2, stack 3, and combustion chamber 4. In the combustion chamber is mounted a still 5 which may consist of a drum formed by a pair of headers 6 and 7 connected by means of a series of vertical tubes 8. These tubes may be say, 4" diameter and say, 20 feet long. The lower header 7 is provided with residuum drawoff 9 controlled by throttle valve 10. The upper header 6 is provided with a feed inlet conduit 11, controlled by throttle valve 12 and connected at its upper end to a hopper 13. The header 6 is provided with vapor outlet pipe 14 provided with throttle valve 15, which pipe 14 leads to condenser coil 16. This condenser coil 16 is seated in condenser box 17, the lower end of which is connected by pipe 18, controlled by throttle valve 19, to the top of receiver 20. The receiver is provided with liquid level gauge 21, pressure gauge 22, liquid drawoff pipe 23, having throttle valve 24. It also has gas outlet pipe 25 controlled by throttle valve 26. By means of the valves 24 and 26, a pressure may be maintained on the system, if desired. A vacuum may also be maintained on the system by means of vacuum pump 27 connected by pipe 28 having throttle valve 29 to the gas outlet pipe 25.

A chlorine gas is introduced into the system by means of pipe 30, provided with a perforated extension 31, extending into the lower header 7. This pipe 30 is provided with a throttle valve 32 and connected to any suitable source of chlorine gas under pressure.

The process may be operated as follows: Oil shale in comminuted form, as for example, from the crusher run of the mine, sufficient to pass a 1" screen, may be fed continuously from the hopper 13 into the upper header 6 and thence down through the tubes. As the oil shale passes through the tubes, it is thus subjected in relatively narrow streams to the heating action of the gases of combustion from the furnace which are free to pass around the tubes. At the same time, the chlorine gas is injected into the lower header and passes upwardly through the tubes countercurrent to the descending oil shale. The oil shale may be heated to a temperature sufficient to destructively distill the oil constituents of the shale. Generally upwards of 800 degrees F. will suffice. The oil may be subjected, both during distillation and condensation, to a pressure of 50 pounds or more. The chlorine gas reacts with the aluminum constituents of the oil shale to form aluminum chloride, which in turn acts as a catalyzer to promote cracking and produce sweet products, as for example, odorless and water-white light oil constituents.

By means of this process, as much as 20% or more of the oil constituents may be converted into light hydrocarbons by the cracking operation. The action of the aluminum chloride will permit of the use of lower temperatures and pressures than might otherwise be reasonable.

In carrying out the process, chlorine derivatives are formed, such as ethylene chloride or chlorine derivatives of the unsaturated hydrocarbons present in the oil constituents of the oil. The process may be operated at atmospheric pressure or the process may be operated under a vacuum of say, 10 to 25 inches. Also where the process is operated under pressure, a differential pressure may be maintained on different parts of the system.

I claim as my invention:

1. A process of destructively distilling oil shale, consisting in subjecting the oil shale containing an aluminum content to the action of heat and pressure to destructively distill the same and separate the light oil constituents therefrom, and simultaneously passing chlorine gas through the hot oil shale, and countercurrent to the direction of movement of the oil shale.

2. A process of destructively distilling oil shale, consisting in subjecting the oil shale containing an aluminum content to the action of heat and pressure to destructively distill the same and separate the light oil constituents therefrom, and simultaneously passing chlorine gas through the hot oil shale.

GUSTAV EGLOFF.